3,637,588
Patented Jan. 25, 1972

3,637,588
POLYOLEFINS STABILIZED WITH MIXTURES COMPRISING A PHOSPHORUS ACID AND A PHENOL

James S. Dix and Ronald D. Mathis, Bartlesville, Okla., and Leslie T. Netherton, Fayetteville, Ark., assignors to Phillips Petroleum Company
No Drawing. Filed Jan. 17, 1969, Ser. No. 792,142
Int. Cl. C08f 45/58, 45/60, 45/62
U.S. Cl. 260—45.75 N      5 Claims

ABSTRACT OF THE DISCLOSURE

Polyolefin resin compositions having improved properties are obtained by incorporating with the resins small amounts of an organophosphonic acid or an organophosphinic acid in combination with other stabilizers, e.g., a benzophenone and a phenol.

---

This invention relates to improvement of polyolefins. More particularly, the invention relates to improving color, thermal stability and ultraviolet stability of polyolefins.

It is known that polyolefin materials such as polyethylene, normally solid polymers of propylene and similar polymers are subject to deterioration due, for example, to heat or exposure to sunlight or ultraviolet radiation with the result that the polyolefin resins become discolored, brittle and lose their extensibility or strength.

Attempts have heretofore been made to overcome such undesirable deterioration by incorporation with polyolefins of stabilizing additives or a combination of stabilizers. Many of the proposed additives, while satisfactory in one or more respects, exhibit certain disadvantages such as less than complete compatibility with the resins or a tendency to adversely affect the color of the products.

It is a principal object of this invention to provide polyolefin compositions containing small amounts of stabilizing additives with the resulting composition having greatly improved thermal and ultraviolet radiation stability as well as improved color value.

The foregoing object as well as others is accomplished by incorporating with a polyolefin a relatively small stabilizing amount of an organophosphonic acid or an organophosphinic acid. These polyolefin stabilizers employed in accordance with this invention can be represented by the formulae:

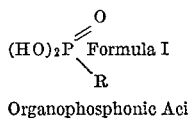
Organophosphonic Acid

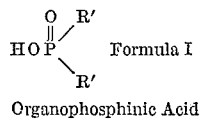
Organophosphinic Acid wherein

R is an aryl radical which can be substituted with up to three alkyl substituents containing from 1 to 20 carbon atoms;

R' is either hydrogen or an aryl group as defined with respect to R with at least one R' being an aryl group.

It is preferred that the aryl substituent of the organophosphonic or organophosphinic acids contain no more than three rings. Thus, R and R' can include, for example, such radicals as phenyl, tolyl, ethylphenyl, butylphenyl, propyltolyl, ethylhexylphenyl, naphthyl, anthryl, phenanthryl and the like. Representative of the polyolefin stabilizing acids employed in this invention are phenylphosphonic acid, 1-naphthylphosphonic acid, 5,8 - dioctyl - 2 - anthrylphosphonic acid, 9-eicosyl-3-phenanthrylphosphonic acid, 2,4,6-trieicosylphenylphosphonic acid, 4 - methylphenylphosphonic acid, phenylphosphinic acid, diphenylphosphinic acid, phenyl(1-naphthyl)phosphinic acid, 8 - anthrylphosphinic acid, di-(3 - phenanthryl)phosphinic acid, 4 - eicosylphenylphosphinic acid, 3,5,8-tributylanthrylphosphinic acid, di(2,4,6-triethylphenyl)phosphinic acid, and the like. The organophosphonic and organophosphinic acids are employed in the polyolefin compositions in accordance with this invention in relatively small amounts ranging from about 0.01 to 3 parts per 100 parts by weight of the polyolefin resin (php.).

The organophosphonic or organophosphinic acid stabilizers can be incorporated into the polyolefin resins by any suitable means. Thus, for example, the acid stabilizers can be sprayed on the polymer powder from a solution such as, for example, an acetone solution, prior to pelletizing. Similarly, the compositions can be prepared by dry-blending the additives with polymer, for example in a powder blender, and thereafter mechanically working the dry blend at an elevated temperature. Moreover, the additives can be incorporated with the polyolefin resin by mixing the two in a Banbury mixer and the like. Also, mixing of the stabilizer with the resin can be carried out in an extruder so that the resulting composition is produced in the form of pellets in which form they can be supplied to the plastic molding industry.

It is to be understood that blends in accordance with this invention can contain other ingredients conventionally employed in polyolefin polymers such as, for example, phenolic antioxidants, lubricants, stabilizers against thermal degradation, stress cracking, and the like, pigments, fillers and other components.

The discovery of this invention is generally applicable to polyolefins including polymers and copolymers of 1-olefin monomers having the formula $C_nH_2n$ in which $n$ has a value of 2 to 8, such as polyethylene, polypropylene, ethylene-butene-1 copolymer, polyoctene, and the like, and mixtures thereof.

The improvement achieved by incorporation of the said organophosphonic and organophosphinic acids into polyolefin compositions is readily apparent from the following experimental data in which a normally solid polypropylene is employed as a representative polyolefin, it being appreciated that propylene polymers are subject to severe deterioration by heat and/or light. In the experimental data presented herein the particulate polypropylene was produced using a $TiCl_3 \cdot \frac{1}{3} AlCl_3$ plus diethylaluminum chloride catalyst. The polyolefin compositions were prepared by dry-blending the resin and additives in a blender.

POLYOLEFIN COMPOSITION I

Component:                           Amount (php. of resin)
Polypropylene having a melt flow of 12 (ASTM
  D 1238–62T, Condition L) _____ 100
2,6-di-tertiary-butyl-4-methylphenol _____ 0.07
Distearylthiodipropionate _____ 0.24
Topanol CA=1,1,3-tris(2-methyl-4-hydroxy-5-
  tertiary-butylphenyl)butane _____ 0.12
2-hydroxy-4-n-octoxybenzophenone _____ 0.60

POLYOLEFIN COMPOSITION II

Same as polyolefin composition I plus 0.10 php. phenylphosphinic acid.

POLYOLEFIN COMPOSITION III

Same as polyolefin composition I except only 0.08 php. of Topanol CA was employed plus 0.05 php. phenylphosphinic acid.

POLYOLEFIN COMPOSITION IV

Component: Amount (php. of resin)
Polypropylene having a melt flow of 12 (ASTM
  D 1238–62T, Condition L) _____ 100
2,6-di-tertiary-butyl-4-methylphenol _____ 0.07
Distearylthiodipropionate _____ 0.24
Irganox 1093=di-n-octadecyl-3,5,di-tertiary-bu-
  tyl-4-hydroxybenzyl phosphonate _____ 0.12
2-hydroxy-4-n-octoxybenzophenone _____ 0.60

POLYOLEFIN COMPOSITION V

Same as polyolefin composition IV plus 0.10 php. phenylphosphinic acid.

The above five polyolefin compositions were tested in a melt indexer in the following manner:

Five grams of the compositions were charged to a melt indexer at a temperature of 275° C. After five minutes with no weight on the piston the sample was pushed out and a 62-mil button compression molded for color comparison. The color of the 62-mil buttons ranged from a distinct yellow to clear white and were ranked in the following order by a consensus of six individuals.

Polyolefin composition:
II _____ White.
V _____ White.
III _____ Off white.
IV (control) _____ Light yellow.
I (control) _____ Yellow.

It is seen from the above that the compositions containing the organophosphinic acid (II, III and V) exhibited superior color when subjected to high temperatures.

POLYOLEFIN COMPOSITION VI

Component: Amount (php. of resin)
Polypropylene having a melt flow of 3 (ASTM
  D 1238–62T, Condition L) _____ 100
Irganox 1093=di-n-octadecyl-3,5,di-tertiary-bu-
  tyl-4-hydroxybenzyl phosphonate _____ 0.02
Calcium stearate _____ 0.05
2-hydroxy-4-n-octoxybenzophenone _____ 0.50
Nickel phenol-phenolate of bis(p-octylphenol)
  monosulfide _____ 1.50

POLYOLEFIN COMPOSITION VII

Same as polyolefin composition VI plus 0.10 php. phenylphosphinic acid.

POLYOLEFIN COMPOSITION VIII

Same as polyolefin composition VI plus 0.10 php. phenylphosphonic acid.

POLYOLEFIN COMPOSITION IX

Same as polyolefin composition VI plus 0.10 php. phenylphosphinic acid and 0.20 php. distearlythiodipropionate.

Polyolefin compositions VI through IX were tested in a melt indexer in the following manner:

Five grams of the compositions were charged to a melt indexer at a temperature of 275° C. After five minutes with no weight on the piston, a 1 minute cut was taken with a large weight (2160 grams). The remainder was pushed out of the indexer immediately and 62-mil buttons were compression molded for color comparison. The thermal stability of the compositions, which is indicated by either no increase or a decrease in the melt flow (grams/1 minute), was also determined. The color comparison and the thermal stability is shown below:

| Composition | Melt flow (g./1 min.) | Color ranking (value of 1 being the lightest) |
|---|---|---|
| Polyolefin Composition VII | 0.72 | 1 |
| Polyolefin Composition VIII | 1.89 | 2 |
| Polyolefin Composition IX | 1.23 | 3 |
| Polyolefin Composition VI (control) | 2.42 | 4 |

It will be noted from the above that incorporation of the organophosphinic or organophosphonic acids afford improvement in color as well as improvement in thermal stability.

POLYOLEFIN COMPOSITION X

Component: Amount (php. of resin)
Polypropylene having a melt flow of 3 (ASTM
  D–1238–62T, Condition L) _____ 100
Dilaurylthiodipropionate _____ 0.70
Irganox 858=4,6-di(4-hydroxy-3,5-di-tertiary-
  butylphenoxy)-2-octylthio-1,3,5-triazine ____ 0.07
Calcium stearate _____ 0.05
2-hydroxy-4-n-octoxybenzophenone _____ 0.52
Nickel phenol-phenolate of bis(p-octylphenol)
  monosulfide _____ 0.55

POLYOLEFIN COMPOSITION XI

Same as polyolefin composition X plus 0.10 php. dioctylphosphite.

POLYOLEFIN COMPOSITION XII

Same as polyolefin composition X plus 0.10 php. phenylphosphinic acid.

Polyolefin compositions X, XI and XII were tested in the following manner:

Five grams of the compositions were charged to a melt indexer at a temperature of 275° C. After five minutes with no weight on the piston, a 1-minute cut was taken with a large weight (2160 grams). The 1-minute cut was used for compression molding of 5-mil films. These films were then exposed to a bank of black light/sunlight (BL/SL) lamps (see Anal. Chem. 25, 460 (1953)) until failure caused by a bend of 180 degrees. The results obtained were as follows:

| Polyolefin composition: | Failure time in hours (BL/SL) |
|---|---|
| X (control) | 1470 |
| XI (control) | 1600 |
| XII | 2020 |

The above data illustrate the significant improvement in stability to ultraviolet radiation achieved by use of the stabilizers of this invention.

Yarns containing eight 15-d.p.f. filaments made from polyolefin compositions I and II were exposed to a bank of black light/sunlight (BL/SL) lamps to determine the percentage of tenacity retained after exposure to the BL/SL lamps for various periods. The results of this comparison are shown below:

| Composition | Percent tenacity retained (BL/SL) | | | |
|---|---|---|---|---|
| | 200 hrs. | 300 hrs. | 400 hrs. | 500 hrs. |
| Polyolefin composition I (control) | 73 | 45 | 14 | 9 |
| Polyolefin composition II | 95 | 84 | 63 | 53 |

From the above it is apparent that the polyolefin composition II, containing a stabilizer of this invention, exhibited significantly better tensile retention during exposure to ultraviolet radiation.

Those modifications and equivalents which fall within the spirit of the invention are to be considered a part thereof.

We claim:

1. A composition comprising a homopolymer or copolymer of a mono-1-olefin having from 3 to 8 carbon atoms having admixed therewith small amounts of:
  (1) a compound selected from the group consisting of 2-hydroxy-4-n-octoxybenzophenone and nickel phenol-phenolate of bis(p-octylphenol)monosulfide,
  (2) a compound selected from the group consisting of 2,6-di-t-butyl-4-methylphenol; 1,1,3-tris-(2-methyl-4-hydroxy-5-t-butylphenyl)butane; di-n-octadecyl-3,5-di-t-butyl-4-hydroxybenzyl phosphonate and 4,6-di- (4-hydroxy-3,5-di-t-butylphenoxy)-2-octylthio-1,3,5-triazine, and (3) a stabilizing compound selected from the group of compounds having the formulae:

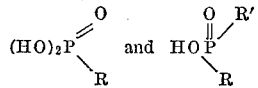

wherein

R is an aryl radical which can be substituted with up to three alkyl substitutents containing from 1 to 20 carbon atoms;

R' is either hydrogen or an aryl group as defined with respect to R with at least one R' being an aryl group.

2. A composition in accordance with claim 1 wherein the said stabilizing compound is present in an amount of from 0.01 to 3 parts by weight per 100 parts by weight of the polyolefin.

3. A composition in accordance with claim 1 wherein the said stabilizing compound is phenylphosphinic acid.

4. A composition in accordance with claim 1 wherein the said stabilizing compound is phenylphosphonic acid.

5. A composition in accordance with claim 1 wherein the polyolefin is polypropylene.

References Cited

UNITED STATES PATENTS

| 3,244,667 | 4/1966 | Burgess | 260—45.75 |
| 3,313,771 | 4/1967 | Dressler et al. | 260—45.85 |
| 3,318,841 | 5/1967 | Tomlinson et al. | 260—45.75 |
| 3,325,448 | 6/1967 | Tanaka et al. | 260—45.75 |
| 3,345,432 | 10/1967 | Gillham et al. | 260—887 |
| 3,454,521 | 7/1969 | Tholstrup | 260—45.75 |
| 3,493,538 | 2/1970 | Salyer et al. | 260—45.95 |

DONALD E. CZAJA, Primary Examiner

R. A. WHITE, Assistant Examiner

U.S. Cl. X.R.

260—45.7 P, 45.8 N, 45.95

UNITED STATES PATENT OFFICE
CERTIFICATE OF CORRECTION

Patent No. 3,637,588   Dated January 25, 1972

Inventor(s) James S. Dix, Ronald D. Mathis and Leslie T. Netherton

It is certified that error appears in the above-identified patent and that said Letters Patent are hereby corrected as shown below:

Column 1, line 53, "Formula I", second occurrence, should be -- Formula II --

Column 2, line 37, "$C_nH_{2\underline{n}}$" should be -- $C_nH_{2n}$ -- and "$\underline{n}$" should be -- n --

Column 5, line 6, after "and" the formula should read as follows:

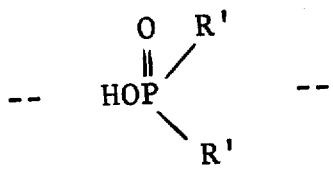

Signed and sealed this 6th day of June 1972.

(SEAL)
Attest:

EDWARD M. FLETCHER, JR.
Attesting Officer

ROBERT GOTTSCHALK
Commissioner of Patents